United States Patent [19]

Tsuruta et al.

[11] Patent Number: 4,841,403

[45] Date of Patent: Jun. 20, 1989

[54] LID SPRING LOCKING STRUCTURE IN A MAGNETIC TAPE CASSETTE

[75] Inventors: Masao Tsuruta; Seiji Kiuchi; Akira Honjyoh; Kengo Oishi; Osamu Suzuki, all of Kanagawa, Japan

[73] Assignee: Fuji Photo Film Co., Ltd., Kanagawa, Japan

[21] Appl. No.: 51,220

[22] Filed: May 14, 1987

Related U.S. Application Data

[63] Continuation of Ser. No. 586,924, Mar. 7, 1984, abandoned.

[30] Foreign Application Priority Data

Mar. 7, 1983 [JP] Japan .................. 58-31509

[51] Int. Cl.$^4$ ................. G11B 23/02; G11B 15/32
[52] U.S. Cl. .................... 360/132; 242/198
[58] Field of Search ............. 360/132, 134, 93, 95, 360/85; 242/197–200

[56] References Cited

U.S. PATENT DOCUMENTS

| | | | |
|---|---|---|---|
| 4,418,373 | 11/1983 | Fujimori et al. | 360/132 |
| 4,484,248 | 11/1984 | Ogiro et al. | 360/132 |
| 4,524,927 | 6/1985 | Sieben | 360/132 |
| 4,642,722 | 2/1987 | Gebeke et al. | 360/132 |

FOREIGN PATENT DOCUMENTS

| | | | |
|---|---|---|---|
| 146218 | 1/1981 | Fed. Rep. of Germany | 360/132 |
| 147172 | 9/1982 | Japan | 360/132 |
| 164068 | 9/1983 | Japan | 360/132 |

Primary Examiner—Stuart N. Hecker
Assistant Examiner—David J. Severin
Attorney, Agent, or Firm—Sughrue, Mion, Zinn, Macpeak & Seas

[57] ABSTRACT

A miniature video magnetic tape cassette which is easy to assemble. An opening is formed in a front part of a cassette body which is covered by a guard panel, with the guard panel being swingably supported on the cassette body by shafts protruding from an inner surface of the side walls of the guard panel fitted into openings in the cassette body. A coil spring is supported on each supporting shaft with one end of each spring engaged with the guard panel to urge the guard panel toward the closed position of the opening. The other end of each coil spring is held by a locking structure provided on an inner surface adjacent to side wall of the upper half of the cassette body. The locking structure may be a locking shaft with the other end of the coil spring engaged with the locking shaft. Otherwise, the locking structure can be formed by a gap between the side wall of the upper half of the cassette and a supporting side wall inwardly thereof, in which case the other end of the coil spring is inserted into the gap and fixedly held therein with a block fitted in the gap.

9 Claims, 2 Drawing Sheets

LID SPRING LOCKING STRUCTURE IN A MAGNETIC TAPE CASSETTE

This is a continuation, of application Ser. No. 586,924 filed Mar. 7, 1984, now abandoned.

BACKGROUND OF THE INVENTION

The present invention relates to small magnetic tape cassettes, and more particularly to a miniature video magnetic tape cassette in which a guard panel covers an opening formed in the front part of the cassette body through which the magnetic tape can be extracted for playing and recording.

Magnetic tapes and magnetic recording and reproducing devices are continually being improved in performance. There has been a strong demand for provision of a portable video system which is more mobile than a conventional stationary video system and can be used outdoors. In order to meet this requirement, it is essential to miniaturize not only the video equipment but also the magnetic tape cassettes used therewith.

When a video magnetic tape cassette is loaded into a magnetic recording and reproducing device (VTR-video tape recorder), a mechanism in the device operates so that the magnetic tape is pulled out of the cassette through an opening formed in the front part of the cassette for recording or reproducing signals.

When the cassette is not in use, in order to protect the magnetic tape from damage, the opening is closed by a guard panel which is pivotally supported by the side walls of the cassette and urged toward the closed position at all times.

FIG. 1 is a perspective view showing the essential components of a conventional cassette of the type having a tape withdrawal opening formed in the front part of the cassette covered by a guard panel which is elastically urged to close the opening at all times. As shown in FIG. 1, a torsion spring 1 is disposed around a shaft 4 which protrudes from the inner surface of a side wall 3 of the guard panel 2. One end of the spring is abutted against the inner surface 5 of the front portion of the upper wall of the cassette, while the other end is locked to a protrusion 6 which extends from the cylindrical surface of the shaft 4. The spring 1 urges the guard panel 2 toward the closed position.

With the protrusion 6 extending from the cylindrical surface of the shaft 4 on the side wall 3 of the guard panel 2 as described above, since the torsion spring 1 is relatively long, the length of the shaft 4 protruding inside the cassette is relatively large and it is necessary to provide a large space to accommodate the shaft 4. In assembling the cassette, with one end of the spring 1 locked to the protrusion 6 and with the other end temporarily retained on the inner surface 7 of the upper wall of the guard panel 2, the front part 5 of the upper wall of the cassette is engaged with the upper wall of the guard panel 2 in such a manner that the front part 5 of the upper wall of the cassette is set below the inner surface 7 of the upper wall of the guard panel 2. In this operation, the other en of the spring 1 is moved from the inner surface 7 of the upper wall of the guard panel 2 to the inner surface of the front part 5 of the upper wall of the cassette. Due to the fact that the other end of the spring is temporarily retained on the upper wall of the guard panel, and hence that the assembly of the cassette cannot be achieved without temporarily retaining the spring on the upper wall of the guard panel, the conventional magnetic tape cassette cannot always be easily miniaturized. Moreover, as the other end of the spring is temporarily retained on the upper wall of the guard panel as described above, cassette assembly is difficult to satisfactorily carry out when the various components thereof are miniaturized.

An object of this invention is thus to provide a miniaturized magnetic cassette tape in which the above-described difficulties accompanying a conventional magnetic tape cassette have been eliminated and which can be readily assembled.

SUMMARY OF THE INVENTION

In accordance with the invention, these objects are attained by arranging coil springs adapted to urge the guard panel to its closed position in a small space formed on the respective cassette side walls.

More specifically, the foregoing and other objects of the invention have been achieved by the provision of a magnetic tape cassette in which an opening provided in the front part of a cassette body is covered by a guard panel, and in which supporting shafts are provided protruding from the inner surfaces of the side walls of the guard panel near the opening. The supporting shafts are supported by the side walls of the cassette body adjacent to the opening. The guard panel is movable with respect to the cassette body to open and close the opening. A coil spring supported on each supporting shaft has one end engaged with the guard panel, thus urging the guard panel through the other end of the coil spring toward the closed position. According to the invention, the other end of each coil spring is fixedly held by locking means provided on an inner surface adjacent the side wall of the upper half of the cassette body.

DESCRIPTION OF THE PREFERRED EMBODIMENTS

A preferred embodiment of a magnetic tape cassette constructed according to the invention will be described with reference to the accompanying drawings.

Figure 1:
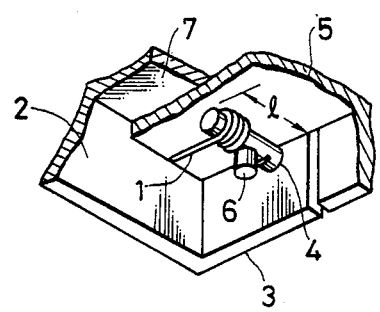
FIG. 1 is a perspective view showing a guard panel structure in a conventional magnetic tape cassette.
Figure 2:
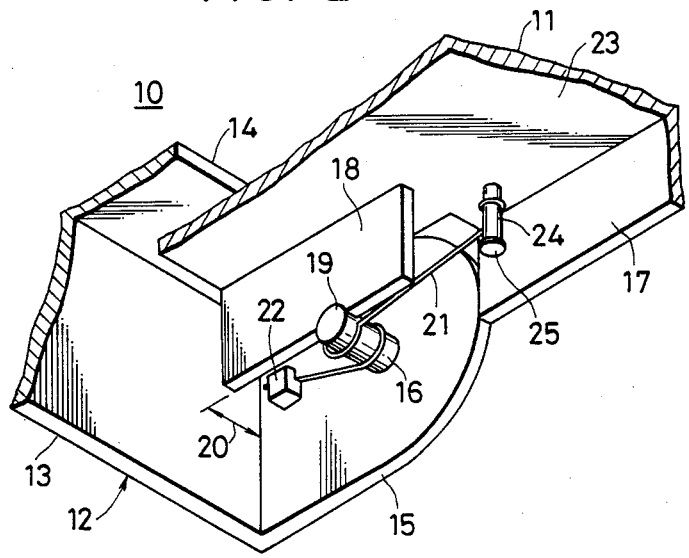
FIG. 2 is a perspective view showing essential components of a preferred embodiment of a magnetic tape cassette according to the invention.

FIG. 2 is a perspective view showing the essential components of a cassette of the invention. The cassette 10 is formed by combining an upper half 11 and a lower half (not shown for simplification). An opening is formed in the front part of the cassette 10 through which the magnetic tape can be extracted. The opening is covered by a guard panel 12. The guard panel 12 has a front wall 13 adapted to cover the front surface of the opening, an upper wall 14 adapted to cover the upper surface of the opening, and side walls 15 extending from both ends of the front wall 13 and perpendicular to the front wall 13. A relatively short supporting shaft 16 protrudes from the inner surface of each side wall 15.

The upper half 11 has two side walls 17. Each side wall 17 is provided with a supporting wall 18 which is positioned near the opening and spaced apart from the, side wall 17. A semicircular cut 19 is formed in the lower portion of each supporting wall 18. Similar to as in the upper half 11, semicircular cuts 19 are formed in the lower half in correspondence to those formed in the supporting walls 18 of the upper half. The cuts 19 form shaft holes when the upper and lower halves are combined together.

The guard panel 12 is swingably supported by engaging its supporting shafts 16 with the shaft holes formed by the supporting walls. There is a small gap (of about 1 mm) between the supporting wall 18 and the side wall 15 of the guard panel 12.

A coil spring 21 which urges the guard panel 12 to the closed position is disposed on each supporting shaft 16. One end of the coil spring 21 is detachably engaged with an engaging protrusion 22 inside the side wall 15 closer to the front wall than the supporting shaft 16, and the other end is disposed on a locking shaft 24 protruding from the inner surface of the upper wall 23 of the upper half. The other end of the coil spring 21 is fixedly secured to the locking shaft 24 by deforming the top 25 of the locking shaft, for instance, by ultrasonic welding.

Figure 3:
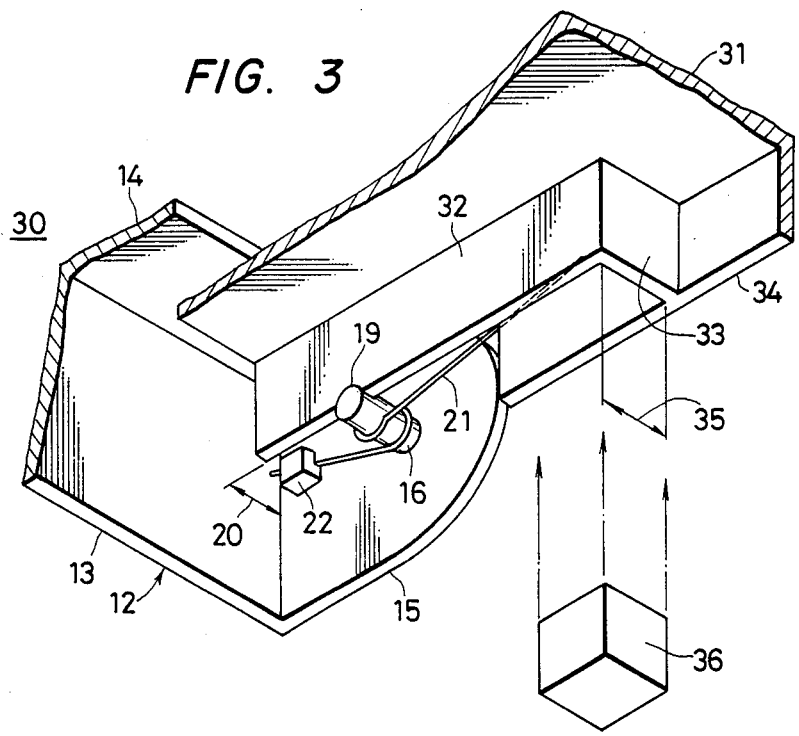
FIG. 3 is a perspective view showing essential components of a modification of the cassette according to the invention.

FIG. 3 shows a modification of the cassette according to the invention. The cassette of FIG. 3 differs from that of FIG. 2 in that on the side of each side wall of he upper half, a supporting wall 32 formed at the same position as that of the embodiment of FIG. 2 extends toward the rear wall of the upper half and has a perpendicular portion 33, thus forming an L-shaped wall composed of supporting walls 32 and 33 with a gap 35 being formed between the side wall 34 of the upper half 31 and the supporting wall 32. Thus, in the modification, in addition to the gap 20 in FIG. 2, the gap 35 is formed. The other end of the coil spring 21 is inserted into the gap 35. Under this condition, a block 36, corresponding in dimensions and configuration to the gap 35, is press fitted into the gap 35, thus fixedly holding the other end of the coil spring 21.

As is apparent from the above description, in the cassette 10 (or 30) according to the invention, each coil spring 21 is accommodated in the small gap 20 (or 35) formed along the side wall 17 (or 34). That is, no intricate protrusion is formed inside the cassette. Accordingly, the technical concept of the invention is most suitable for miniatuarization of cassettes. As each coil spring 21 is held stable with its one end engaged with the engaging protrusion 22 on the guard panel and its other end fixedly secured to the upper half 11 (or 31) as described above, the cassette 10 (or 30) can be assembled with a considerably high efficiency.

Since the spring 21 is held stable, the cassette will never suffer from the problem that the coil or coils is dislodged during the use of the cassette.

We claim:

1. In a magnetic tape cassette in which an opening provided in the front part of a cassette body is covered by a guard panel (12), and in which supporting shafts (16) protrude from the inner surfaces of the side walls (15) of said guard panel near said opening, said guard panel being rotatable with respect to said cassette body to open and close said opening, and a coil spring (21) supported on each supporting shaft has a first end engaged with said guard panel urging said guard panel through a second end of said coil spring to rotate to close said opening, the improvement wherein the first end is engaged with a protrusion, integral with said guard panel, for detachably engaging the first end to said guard panel, and the second end of each coil spring is fixedly secured to looking means provided on an inner surface adjacent a side wall of an upper half of said cassette body so that said second end is stationary with respect to said locking means regardless of rotation of said guard panel.

2. A magnetic tape cassette comprising:
   (a) a cassette body (10) having a front part, said front part having an opening provided therein, and said cassette body having an upper half with side walls (17);
   b) a guard panel (12) for covering said opening, said guard panel being rotatably supported on said cassette body to open and close said opening, and said guard panel having a front wall and side walls (15);
   (c) supporting shafts (16), said supporting shafts being protruded from the inner surfaces of said side walls of said guard panel;
   (d) a coil spring (21), wound on each supporting shaft, for urging said guard panel to rotate to close said opening, said coil spring having a first end detachably engaged with said guard panel at a position closer to said front wall of said guard panel than said supporting shaft; and
   (e) locking means, provided on an inner surface of said cassette body, for fixedly securing a second end of each coil spring to the cassette body so that said second end is non-detachably engaged with said locking means regardless of rotation of said guard panel.

3. The magnetic tape cassette as claimed in claim 2, wherein said cassette body has inner walls (18) for respectively supporting said supporting shafts on an opposite side of said supporting shafts with respect to said spring than said side walls of said guard panel.

4. In a magnetic tape cassette in which an opening provided in the front part of a cassette body is covered by a guard panel (12), and in which supporting shafts (16) protrude from the inner surfaces of the side walls (15) of said guard panel near said opening, said guard panel being rotatable with respect to said cassette body to open and close said opening, and a coil spring (21) supported on each supporting shaft has a first end engaged with said guard panel urging said guard panel through a second end of said coil spring to rotate to close said opening, the improvement wherein the second end of each coil spring is fixedly secured to locking means provided on an inner surface adjacent a side wall of an upper half of said cassette body, and said locking means comprises a block (36) fitted in a gap which is formed by the side wall of said upper half and a supporting wall provided inwardly of the side wall of said upper half, the second end of said coil spring being inserted into said gap and fixedly held by said block.

5. A magnetic tape cassette comprising:
   (a) a cassette body (10) having a front part, said front part having an opening provided therein, and said cassette body having an upper half with side walls (17);
   (b) a guard panel (12) for covering said opening, said guard panel being rotatably supported on said cassette body to open and close said opening, and said guard panel having side walls (15);
   (c) supporting shafts (16), said supporting shafts being protruded from the inner surfaces of said side walls of said guard panel; and
   (d) a coil spring supported on each supporting shaft, said coil spring having a first end engaged with said guard panel urging said guard panel through a second end of said coil spring to close said opening, said second end of each coil spring being fixedly secured to locking means provided on an inner surface adjacent to said side walls of said cassette body,
wherein said locking means comprises a block 36 fitted in a gap which is formed by the side wall of said upper half and a supporting wall provided inwardly of the side wall of said upper half, the second end of said coil spring being inserted into said gap and fixedly held by said block.

6. In a magnetic tape cassette in which an opening provided in the front part of a cassette body is covered by a guard panel (12), and in which supporting shafts (16) protrude from the inner surfaces of the side walls (15) of said guard panel near said opening, said guard panel being rotatable with respect to said cassette body to open and close said opening, and a coil spring (21) supported on each supporting shaft has a first end engaged with said guard panel urging said guard panel through a second end of said coil spring to rotate to close said opening, the improvement wherein the first end is engaged with a protrusion, integral with said guard panel, for detachably engaging the first end to said guard panel, and the second end of each coil spring is fixedly secured to locking means provided on an inner surface adjacent a side wall of an upper half of said cassette body so that said second end is stationary with respect to said locking means regardless of rotation of said guard panel,
wherein said locking means comprises a locking shaft (24), and the second end of said coil spring is fixedly secured to said locking shaft.

7. A magnetic tape cassette comprising:
(a) a cassette body (10) having a front part, said front part having an opening provided therein, and said cassette body having an upper half with side walls (17);
(b) a guard panel (12) for covering said opening, said guard panel being rotatably supported on said cassette body to open and close said opening, and said guard panel having a front wall and side walls (15);
(c) supporting shafts (16), said supporting shafts being protruded from the inner surfaces of said side walls of said guard panel;
(d) a coil spring (21), wound on each supporting shaft, for urging said guard panel to rotate to close said opening, said coil spring having a first end detachably engaged with said guard panel at a position closer to said front wall of said guard panel than said supporting shaft; and
(e) locking means, provided on an inner surface of said cassette body, for fixedly securing a second end of each coil spring to the cassette body wherein said locking means comprises a locking shaft (24), and the second end of said coil spring is fixedly secured to said locking shaft.

8. A magnetic tape cassette comprising:
(a) a cassette body (10) having a front part, said front part having an opening provided therein, and said cassette body having an upper half with side walls (17);
(b) a guard panel (12) for covering said opening, said guard panel being rotatably supported on said cassette body to open and close said opening, and said guard panel having a front wall and side walls (15);
(c) supporting shafts (16), said supporting shafts being protruded from the inner surfaces of said side walls of said guard panel;
(d) a coil spring (21), wound on each supporting shaft, for urging said guard panel to rotate to close said opening, said coil spring having a first end detachably engaged with said guard panel at a position closer to said front wall of said guard panel than said supporting shaft; and
(e) locking means, provided on an inner surface of said cassette body, for fixedly securing a second end of each coil spring to the cassette body, wherein said locking means is a locking shaft protruded from an inner surface of a top wall of said cassette, and said second end of said coil spring is fixedly secured to said locking shaft.

9. A magnetic tape cassette as claimed in claim 8, wherein said locking shaft has an enlarged portion (25) at a lower end thereof.

* * * * *